United States Patent [19]
Sasakura et al.

[11] Patent Number: 5,500,932
[45] Date of Patent: Mar. 19, 1996

[54] SLIP OUTPUT APPARATUS

[75] Inventors: Miyoshi Sasakura, Higashiyamato; Osamu Ohkura, Oome; Takehiko Mizoguchi; Satoru Hori, both of Hamura; Satoshi Yoshida, Akigawa, all of Japan

[73] Assignee: Casio Computer Co., Ltd., Tokyo, Japan

[21] Appl. No.: 37,095

[22] Filed: Mar. 25, 1993

[30]     Foreign Application Priority Data

May 29, 1992 [JP] Japan ..................... 4-161789

[51] Int. Cl.⁶ ........................................... G06F 17/00
[52] U.S. Cl. ..................... 395/149; 395/148; 395/161
[58] Field of Search ........................ 395/148, 149, 395/155, 161; 382/9, 173–180, 305; 1/61; 364/401–408

[56]              References Cited

U.S. PATENT DOCUMENTS

| | | | |
|---|---|---|---|
| 3,822,378 | 7/1974 | Kashio | 235/176 |
| 4,003,031 | 1/1977 | Kashio | 340/172.5 |
| 4,031,515 | 6/1977 | Kashio | 364/200 |
| 4,032,900 | 6/1977 | Kashio | 364/200 |
| 4,034,350 | 7/1977 | Kashio | 364/900 |
| 4,064,553 | 12/1977 | Kashio | 364/200 |
| 4,079,234 | 3/1978 | Kashio | 235/92 DE |
| 4,103,334 | 7/1978 | Kashio | 364/900 |
| 4,133,041 | 1/1979 | Kashio | 364/900 |
| 4,145,753 | 3/1979 | Kashio | 364/900 |
| 4,321,672 | 3/1982 | Braun et al. | 364/408 |
| 4,360,872 | 11/1982 | Suzuki et al. | 364/405 |
| 4,370,707 | 1/1983 | Phillips et al. | 364/200 |
| 4,555,759 | 11/1985 | McCaskill et al. | 364/300 |
| 4,633,397 | 12/1986 | Macco | 364/406 |
| 4,642,767 | 2/1987 | Lerner | 364/406 |
| 4,667,292 | 5/1987 | Mohlenbrock et al. | 364/406 |
| 4,730,252 | 3/1988 | Bradshaw | 364/403 |
| 4,809,170 | 2/1989 | Leblang et al. | 364/200 |
| 4,851,999 | 7/1989 | Moriyama | 364/401 |
| 4,852,000 | 7/1989 | Webb et al. | 364/406 |
| 4,910,676 | 3/1990 | Alldredge | 364/408 |
| 4,914,569 | 4/1990 | Levine et al. | 364/200 |

(List continued on next page.)

FOREIGN PATENT DOCUMENTS

| | | |
|---|---|---|
| 0213276 | 3/1987 | European Pat. Off. . |
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |

OTHER PUBLICATIONS

Quattro Pro User's Guie, Barland International, Spreadsheet Links, 1987, pp. 299–308.

Ralston et al., Encyclopedia of Computer Science and Eng. 1983, pp. 2–6, 441–447.

IBM Technical Disclosure Bulletin, vol. 31, No. 1, Jun., 1988, Armonk, N.Y., pp. 158 and 159, article entitled "Differential Index Management with Low Priority Batch Updating in Database Management Systems".

Proceedings of the 1987 Fall Join Computer Conference "Exploring Technology: Today and Tomorrow", Dallas, Texas Oct. 25–29th, 1987, pp. 452–460, IEEE, by N. Roussopoulos: Overview of ADMS: A High Performance Database Management System.

*Primary Examiner*—Heather R. Herndon
*Assistant Examiner*—Joseph H. Feild
*Attorney, Agent, or Firm*—Frishauf, Holtz, Goodman, Langer & Chick

[57]              ABSTRACT

A disk stores an application program for defining items to be set in a slip image stored/held in a disk and their layout positions. When another slip image similar to this slip image is designated, and part of the slip form is to be modified in accordance with this other slip image, a modification command is input from a keyboard. A definition control section then registers the modification contents in a disk. A modifier section creates a new application program corresponding to the other slip image on the basis of the modification contents in the disk and the definition contents in the disk.

2 Claims, 7 Drawing Sheets

U.S. PATENT DOCUMENTS

| | | | |
|---|---|---|---|
| 4,918,593 | 4/1990 | Huber | 364/200 |
| 4,937,439 | 6/1990 | Wanninger et al. | 235/456 |
| 4,939,689 | 7/1990 | Davis et al. | 364/900 |
| 4,949,258 | 8/1990 | Miyamoto | 364/405 |
| 4,967,348 | 10/1990 | Naito et al. | 364/200 |
| 5,079,695 | 1/1992 | Dysart et al. | 395/700 |
| 5,097,408 | 3/1992 | Huber | 395/600 |
| 5,131,090 | 7/1992 | Fukushima | 395/700 |
| 5,157,767 | 10/1992 | Nihei | 395/149 |
| 5,202,984 | 4/1993 | Kashio | 395/600 |
| 5,228,100 | 6/1993 | Takeda et al. | 382/61 |
| 5,235,654 | 8/1993 | Anderson et al. | 382/61 |
| 5,317,646 | 5/1994 | Song, Jr. et al. | 382/9 |

FIG.3

| INVOICE | A1 YEAR A2 MONTH A3 DAY No. A5 | | | | |
|---|---|---|---|---|---|
| A6 | | | | | |

ARTICLES SHIPPED ARE LISTED BELOW

| TOTAL AMOUNT WITH TAX INCLUDED | A17 | | TAX RATE | A19 % | CONSUMPTION TAX AMOUNT A20 |
|---|---|---|---|---|---|

| | ARTICLE NAME | QUANTITY | UNIT PRICE | AMOUNT (WITH/WITHOUT TAX) | REMARKS |
|---|---|---|---|---|---|
| 1 | A9 | A10 | A11 | A12 | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| SUM TOTAL | | A13 | A14 | A15 | |

INVOICE

A1 YEAR  A2 MONTH  A3 DAY  No. A5

A6

ARTICLES SHIPPED
ARE LISTED BELOW

| ARTICLE NAME | QUANTITY | UNIT PRICE | AMOUNT (WITH/WITHOUT TAX) | REMARKS |
|---|---|---|---|---|
| A9 | A10 | A11 | A12 | |
| 1 | | | | |
| 2 | | | | |
| 3 | | | | |
| 4 | | | | |
| 5 | | | | |
| 6 | | | | |
| 7 | | | | |

| SUM TOTAL | | A13 | | A15 | |
|---|---|---|---|---|---|
| TAX RATE | A19 % | CONSUMPTION TAX AMOUNT | A20 | TOTAL AMOUNT WITH TAX INCLUDED | A17 |

FIG.4

TABLE E(SOURCE FILE DISK 5)

| START POINT COORDINATES | REGION SIZE | TYPE |
|---|---|---|
| A1 | | |
| A2 | | |
| A3 | | |
| A4 | | |
| A5 | | |
| A6 | | |
| A7 | | |
| A8 | | |

DEFINITION FILE (DEFINITION FILE DISK 10)

| START POINT COORDINATES | REGION SIZE |
|---|---|
| A6 | |
| A9 | |
| A10 | |
| A11 | |
| A12 | |
| A1 | |

TABLE E(NEW SOURCE FILE DISK 13)

| START POINT COORDINATES | REGION SIZE | TYPE |
|---|---|---|
| A1 | | |
| A2 | | |
| A3 | | |
| A5 | | |
| A6 | | |
| A9 | | |

FIG.7

SLIP OUTPUT APPARATUS

BACKGROUND OF THE INVENTION

1. Field of the Invention

The present invention relates to a slip output apparatus for printing arbitrarily input slip data according to a predetermined slip format.

2. Description of the Related Art

A conventional information processing apparatus such as an office computer can form and print various types of slips, e.g., sales slips, receipts, order sheets, and invoices. According to such a conventional apparatus, slip processing is performed in accordance with slip processing programs designed in advance by a system engineer or the like in one-to-one correspondence with the respective types of slips.

Since slip processing demands individual slip processing programs designed in one-to-one correspondence with the respective types of slips, even a slight change in a slip form or the like requires a system engineer who is an expert in programming to create a new slip processing program. The creation of such a program is very difficult even for an expert.

SUMMARY OF THE INVENTION

It is an object of the present invention to allow an ordinary user who does not have an expert knowledge of programming and the like to easily change part of a slip form as long as he/she understands the actual business operation.

In order to achieve the above object, according to the present invention, there is provided a slip output apparatus for creating second slip definition data on the basis of first slip definition data, comprising: (A) first storage means (source file disk 5) for storing a creation program for defining creation of output data corresponding to a plurality of items of a first slip, and an output program including region information for defining output regions, on the first slip, of creation data corresponding to the respective items; (B) display means (image scanner 1; CRT display section 11) for receiving a desired slip image and displaying the image; (C) designating means (definition control section 7; keyboard 8), connected to the first storage means and the display means, for arbitrarily designating a region, on the display image, which corresponds to each item of the output program; (D) modification means (modifier section 12) for copying the creation and output programs stored in the first storage means, and modifying the region information corresponding to each item of the copied output program into region information indicating the region designated by the designating means; and (E) second storage means (new source file disk 13) for storing the creation and output programs copied and modified by the modification means as definition information of the second slip.

According to the present invention, therefore, an ordinary user who does not have an expert knowledge of programming and the like can easily change part of a slip form as long as he/she understands the actual business operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a view showing a sample of an invoice;

FIG. 4 is a view showing a sample of another invoice similar to the invoice in FIG. 3;

FIG. 7 is a view showing a state wherein the modifier section 12 modifies a table E on the basis of the contents of a definition file disk 10 to form a new table E.

DETAILED DESCRIPTION OF THE PREFERRED EMBODIMENTS

An embodiment of the present invention will be described below with reference to FIGS. 1 to 8.

Figure 1:
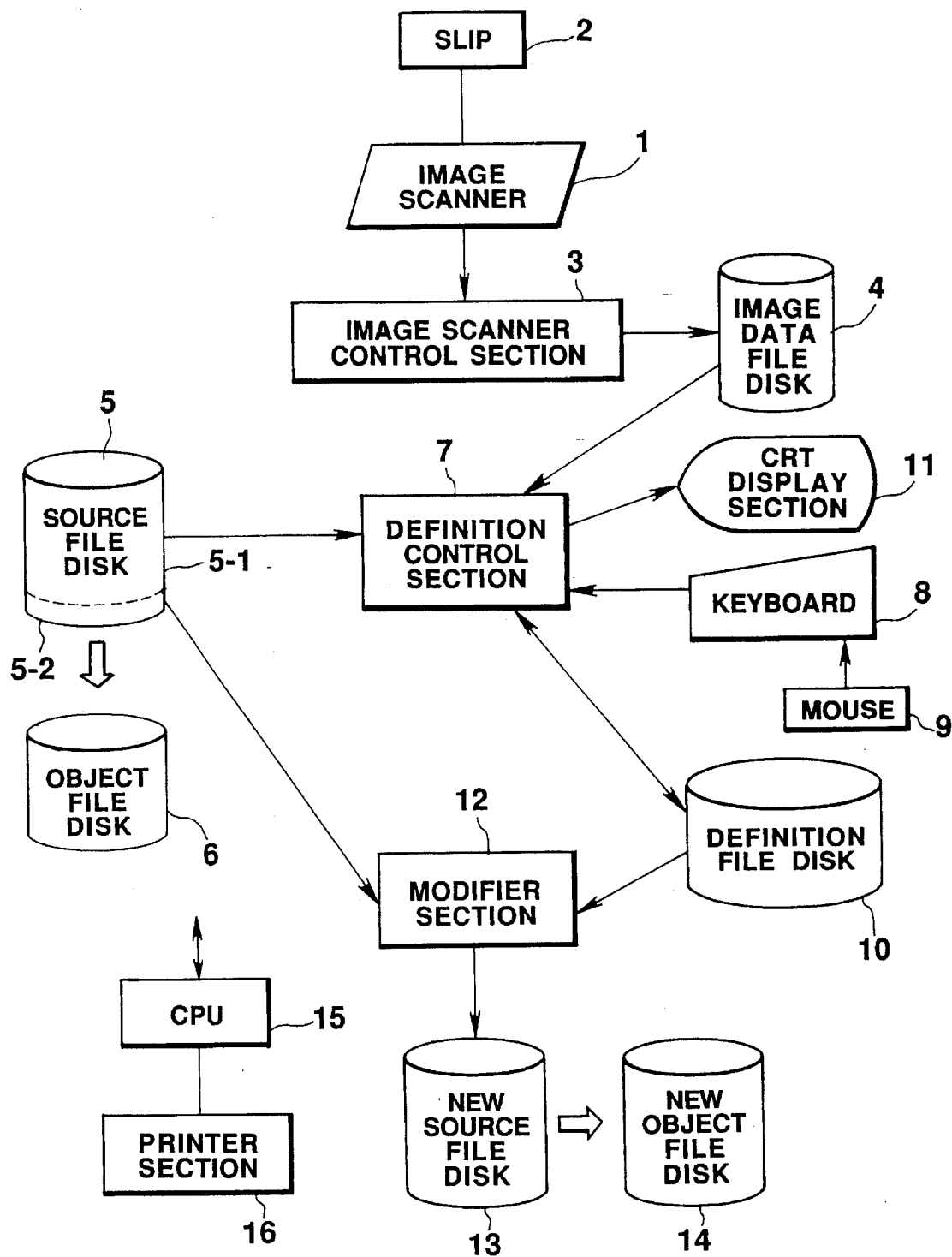
FIG. 1 is a block diagram showing the arrangement of a slip output apparatus according to an embodiment of the present invention.

FIG. 1 is a block diagram showing the arrangement of a slip output apparatus.

An image scanner 1 reads a slip image by scanning a commercially available slip 2. An image scanner control section 3 registers the slip image read by the image scanner 1 in an image data file disk 4.

A source file disk 5 stores application programs (programs for defining processing contents, e.g., input processing, display processing, and print processing (to be described in detail later)) for processing slip images, registered in the image data file disk 4, in units of slip types. These application programs are standard programs prepared in advance by the maker or programs designed by a system engineer. In order to allow the user to arbitrarily change part of an existing application program to create a new application program, the source file disk 5 includes not only an application program storage area 5-1 but also a key list storage area 5-2 for storing key data corresponding to all the items on a slip. Note that an object file disk 6 is a file disk for storing application object files obtained by converting the contents of the source file disk 5 into forms which allow the apparatus to execute the programs.

When the definition contents of an application program stored in the source file disk 5 are to be modified, a definition control section 7 registers definition data, for which a modification command is input from a keyboard 8 or a mouse 9, in a definition file disk 10. In this case, the definition control section 7 reads out slip image data designated as a modification target from the image data file disk 4 and causes a CRT display section 11 to display it.

A modifier section 12 reads out the original application program, for which the command for modifying the definition contents has been input, from the source file disk 5, and copies it into a new source file disk 13. Thereafter, the modifier section 12 creates a new application program by modifying the application program in the new source file disk 13 on the basis of the definition data in the definition file disk 10, and registers the new application program in the new source file disk 13. Note that a new object file disk 14 is a file disk for storing new application programs obtained by converting the contents of the new source file disk 13 into forms which allow the apparatus to execute the programs.

A CPU 15 controls the overall operation of the slip output apparatus. For example, the following input/output devices are connected to the CPU 15: the image scanner control section 3, the keyboard 8, the mouse 9, the CRT display section 11, the object file disk 6, the new object file disk 14, and a printer section 16. The CPU 15 controls the input/output operations of these devices. In this case, in response to a slip output command from the keyboard 8, the CPU 15 executes an object file command stored in the disk 6 or 14 to create and arrange/output data in units of items in accordance with the program.

Figure 2:
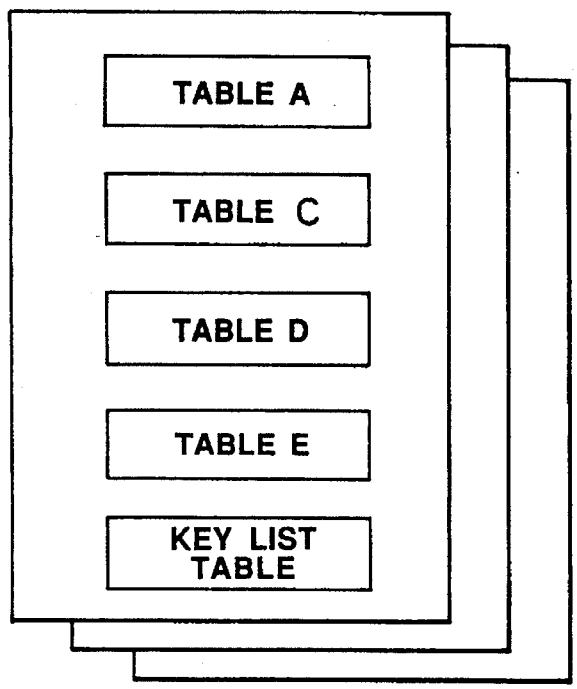
FIG. 2 is a view showing the contents of an application program stored in a source file disk 5.

FIG. 2 shows the contents of an application program, which is constituted by a table A as a program for defining data input/creation processing for each slip, a table C as a program for defining file update processing, a table D as a program for defining display processing, a table E as a program for defining print processing, and a key list table for storing a list of keys. The print form of a slip is defined by the table E. When this table E is formed, a key list table is automatically formed by extracting the items defined in the table E. In this case, the table E is designed to store item start point coordinate data, item region size data, and type data indicating whether data are characters or numerals in one-to-one correspondence with items A1, A2, A3, . . . in which the slip data of an slip image are respectively set.

An operation of this embodiment will be described next.

FIGS. 3 and 4 show two types of invoices having different slip forms. Items "A1", "A2", . . . "A20", of each slip, in which data are respectively set are defined as follows:

"A1", "A2", and "A3" are item regions in which automatically obtained date data (year, month, and day) are set;

"A5" is an item region in which an automatically obtained slip No. is set;

"A6" is an item region in which a customer name retrieved on the basis of an input customer code is set;

"A9" is an item region in which an article name retrieved on the basis of an input article code is set;

"A10" is an item region in which an input quantity is set;

"A11" is an item region in which a unit price retrieved on the basis of an input article code is set;

"A12" is an item region in which an amount automatically calculated according to "unit price ×quantity" is set;

"A13", "A14", and "A15" are item regions in which the sums of quantities, unit prices, and amounts are respectively set;

"A17" is an item region in which a total amount with tax included is set;

"A19" is an item region in which a tax rate is set; and

"A20" is an item region in which a consumption tax amount obtained from a tax rate is set.

The invoices shown in FIGS. 3 and 4 differ in the layout positions of the respective items.

Assume that an application program for outputting the invoice shown in FIG. 3 is stored in the source file disk 5, and that the respective items constituting the print form of the invoice are stored as customize keys. In this case, in response to a command for printing the invoice, the CPU 15 executes the application program for outputting the invoice, and arranges/outputs slip data corresponding to the respective items in accordance with the corresponding definition contents, thereby outputting the invoice shown in FIG. 3.

When the invoice shown in FIG. 4 is to be output as another invoice similar to the invoice shown in FIG. 3, the invoice shown in FIG. 4 is scanned by the image scanner 1. The read slip image is then registered in the image data file disk 4.

Figure 5:
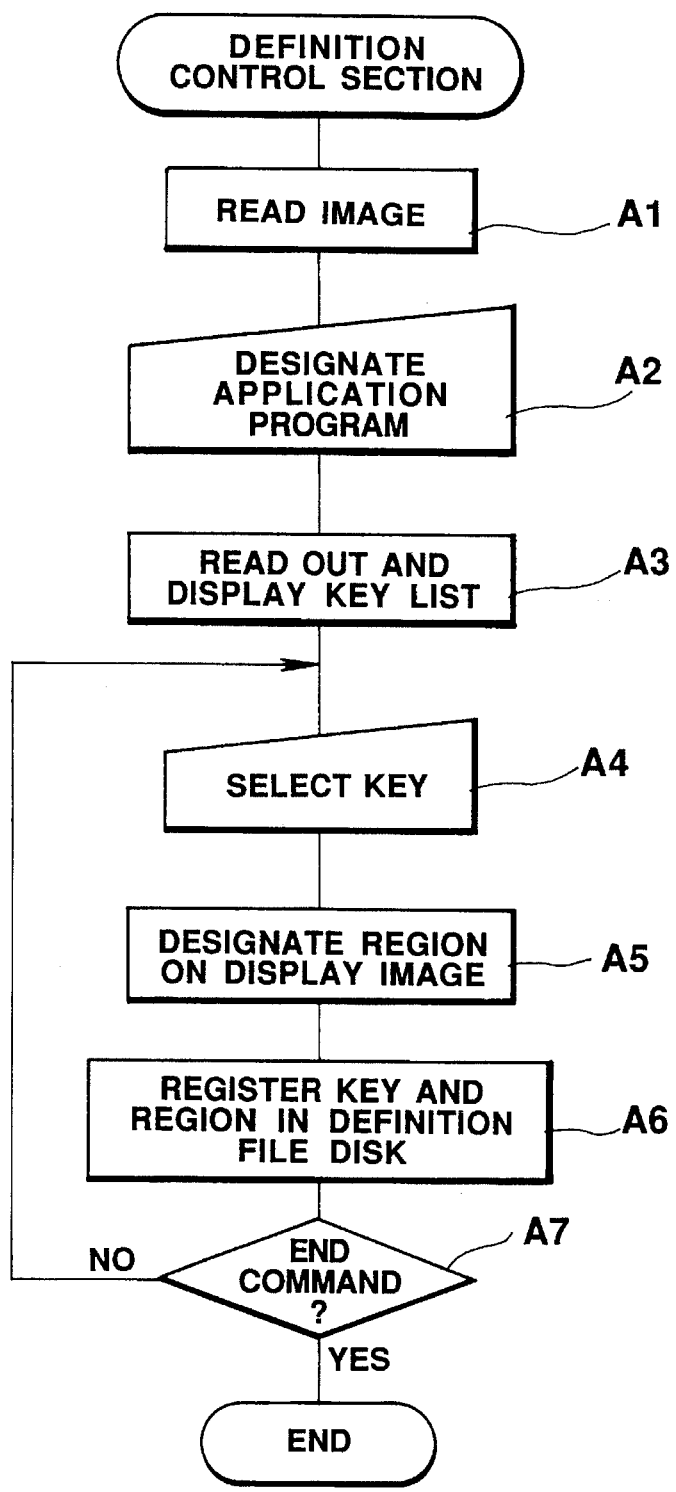
FIG. 5 is a flow chart showing an operation of a definition control section 7.

Subsequently, the definition control section 7 executes an operation according to the flow chart shown in FIG. 5. First the definition control section 7 reads out the slip image data of the invoice shown in FIG. 4 from the image data file disk 4, and causes the CRT display section 11 to display it (step A1). When the application program for the invoice shown in FIG. 3 is designated through the keyboard 8 or the mouse 9 (step A2), the corresponding key list table is read out from the source file disk 5, and the key list stored in the key list table is window-displayed on a slip image displayed on the CRT display section 11 (step A3).

In this state, a key corresponding to a target item to be defined is selected through the keyboard 8 or the mouse 9 (step A4), and the region of the item, i.e., start point coordinates and a region size, is designated on the screen on which the slip image is displayed (step A5). Thereafter, the pair of the designated key item and the designated region (i.e., the start point coordinates and the region size) is registered in the definition file disk 10 (step A6). The flow then advances to step A7 to check whether an end command is input from the keyboard 8 or the mouse 9. The flow keeps returning to step A4 until an end command is input, thus repeating the above-described operation.

Figure 8:
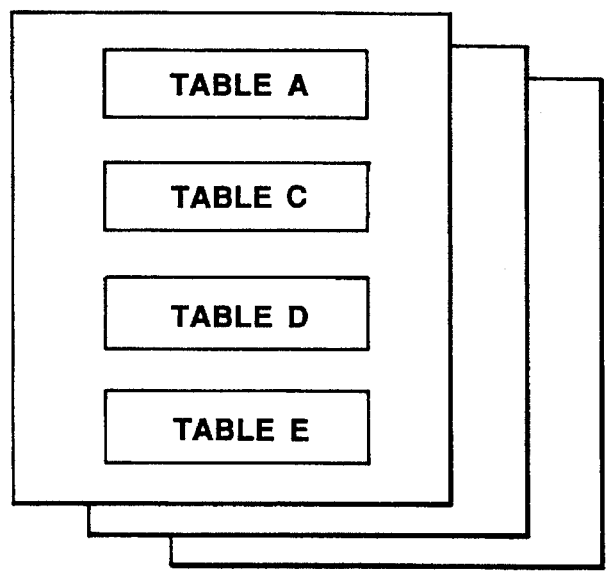
FIG. 8 is a view showing the contents of a newly created application program.
Figure 6:
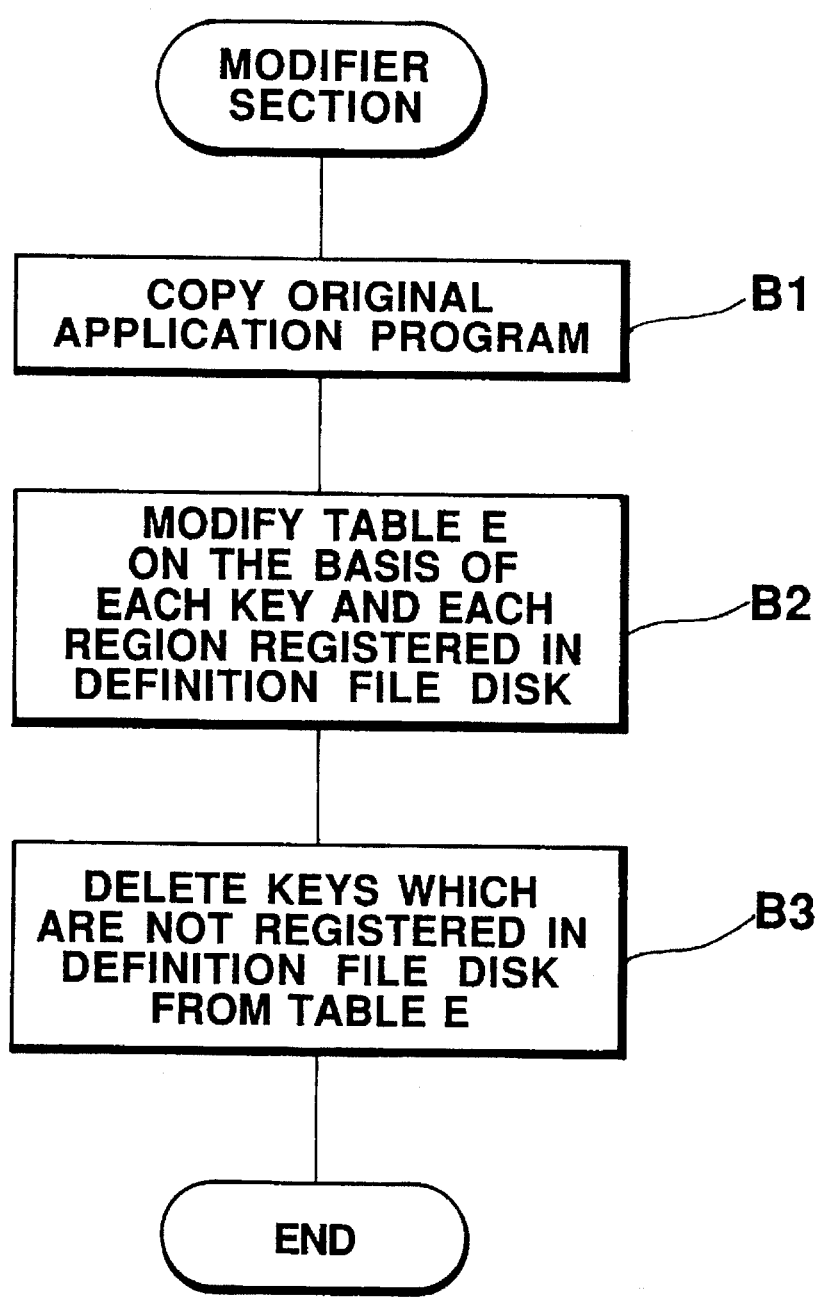
FIG. 6 is a flow chart showing an operation of a modifier section 12.

FIG. 6 is a flow chart showing an operation of the modifier section 12. First the modifier section 12 loads the original application, i.e., the application program for the invoice shown in FIG. 3, and copies it into the new source file disk 13 (step B1). The modifier section 12 then modifies the table E stored in the new source file disk 13 on the basis of the designated key item and region registered in the definition file disk 10 (step B2). Subsequently, the modifier section 12 deletes the key items which are not registered in the definition file disk 10 and all the corresponding data from the table E in the new source file disk 13 (step B3). FIG. 7 shows the new table E obtained by modifying the table E of the original application program on the basis of the contents registered in the definition file disk 10. With this operation, the new application program shown in FIG. 8 is formed on the basis of the original application program (see FIG. 2) and is registered in the new source file disk 13, while a new application object file is formed in the new object file disk 14. By executing the application program of this new application object file, the invoice shown in FIG. 4 can be output. In this case, a commercially available slip is set on the printer section 16, and an image of this slip is displayed by the CRT display section 11. When the operator inputs slip data at the respective item positions on this image, a slip is formed. Subsequently, when a print command is supplied to the apparatus, the slip data are respectively printed at the corresponding item positions on a sheet of paper set on the printer section 16.

Although the above-described embodiment exemplifies the commercially available slip, the present invention can be applied to a custom-made original slip. Alternatively, a slip image which is read by an image reader in advance may be printed on a blank sheet of paper, and slip data may be respectively arranged in the corresponding items.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for generating an application program specific to a user in a slip processing apparatus having a first source file storing an application program comprising a processing program defining processes of item data corresponding to each of a plurality of items on a slip of a predetermined form, an output program defining output areas in one-to-one correspondence with the plurality of items on the slip of a predetermined form, and an item list defining an item name of each item included in the output program, the method comprising the steps of:

(A) inputting an image of a user's slip by scanning the user's slip which a user desires, by an image scanner;

(B) displaying the image of the inputted user's slip on a display screen and displaying, on the display screen as a list, a plurality of item names included in the item list of the application program stored in the first source file;

(C) selecting a desired item name from the plurality of item names displayed in a list on the display screen and designating the output area corresponding to the selected item name on the displayed image of the user's slip displayed on the display screen;

(D) storing area data indicating the designated output area in a definition file in correspondence with the item determined by the selected item name;

(E) repeating the steps (C) and (D) until an end command is input;

(F) copying the application program stored in the first source file into a second source file; and (G) generating a customized application program specific to the user by modifying, by using the area data of each item stored in the definition file, the definition of each output area corresponding to each item of the output program included in the application program copied into the second source file.

2. A method for generating an application program peculiar to a user in a slip processing apparatus having a first source file storing an application program comprising a processing program defining processes of item data corresponding to each of a plurality of items on a slip of a predetermined form, an output program defining output areas in one-to-one correspondence with the plurality of items on the slip of a predetermined form, and an item list defining an item name of each item included in the output program, the method comprising the steps of:

(A) inputting an image of a user's slip by scanning the user's slip which a user desires, by an image scanner;

(B) displaying the image of the inputted user's slip on a display screen and displaying, on the display screen as a list, a plurality of item names included in the item list of the application program stored in the first source file;

(C) selecting a desired item name from the plurality of item names displayed in a list on the display screen and designating the output area corresponding to the selected item name on the displayed image of the user's slip displayed on the display screen;

(D) storing area data indicating a position and an area size of the designated output area in a definition file in correspondence with the item determined by the selected item name;

(E) repetitively executing the selection of an item name and the designation of the position and the area size of the output area in step (C) to store in the definition file a plurality of selected items and area data corresponding to the selected items;

(F) copying all of the application program stored in the first source file into a second source file in order to generate a new separate application program specific to a user from storage contents of the first source file; and (G) modifying the definition of each of the output areas corresponding to the items stored in the definition file by using the area data corresponding to the selected items, respectively, among the items of the output program included in the application program copied in the second source file, and deleting the items which are not coincident with each of the selected items stored in the definition file, among the items of the output program copied in the second source file.

* * * * *